US012768926B2

(12) United States Patent
Jang et al.

(10) Patent No.: US 12,768,926 B2
(45) Date of Patent: Oct. 20, 2026

(54) DIRECTION FINDING METHOD BASED ON UWB, AND ELECTRONIC DEVICE FOR PERFORMING THE SAME

(71) Applicant: KOOKMIN UNIVERSITY INDUSTRY ACADEMY COOPERATION FOUNDATION, Seoul (KR)

(72) Inventors: Byung-Jun Jang, Seoul (KR); Sumin Han, Seoul (KR)

(73) Assignee: Kookmin University Industry Academy Cooperation Foundation, Seoul (KR)

( * ) Notice: Subject to any disclaimer, the term of this patent is extended or adjusted under 35 U.S.C. 154(b) by 260 days.

(21) Appl. No.: 18/606,713

(22) Filed: Mar. 15, 2024

(65) Prior Publication Data

US 2025/0035731 A1 Jan. 30, 2025

(30) Foreign Application Priority Data

Jul. 26, 2023 (KR) ........................ 10-2023-0097798

(51) Int. Cl.
*G01S 3/48* (2006.01)
*G01S 3/04* (2006.01)

(52) U.S. Cl.
CPC ................ *G01S 3/48* (2013.01); *G01S 3/043* (2013.01)

(58) Field of Classification Search
None
See application file for complete search history.

(56) References Cited

U.S. PATENT DOCUMENTS

| | | | | |
|---|---|---|---|---|
| 9,432,966 | B2 * | 8/2016 | Kalliola | G01S 3/14 |
| 10,455,442 | B1 * | 10/2019 | Li | H04W 72/542 |
| 11,125,848 | B2 | 9/2021 | Knaappila | |
| 11,336,361 | B2 | 5/2022 | Xin et al. | |
| 2017/0131381 | A1 | 5/2017 | Malik et al. | |
| 2017/0134900 | A1 * | 5/2017 | Malik | G01S 3/72 |
| 2019/0373594 | A1 * | 12/2019 | Sadiq | H04W 72/51 |
| 2022/0099783 | A1 | 3/2022 | Ranjbar et al. | |

(Continued)

FOREIGN PATENT DOCUMENTS

| | | | |
|---|---|---|---|
| EP | 3961240 | A2 | 3/2022 |
| EP | 4 095 541 | A1 | 11/2022 |

(Continued)

OTHER PUBLICATIONS

Extended European Search Report dated Sep. 6, 2024 in Application No. 24160729.0.

(Continued)

*Primary Examiner* — Bernarr E Gregory
(74) *Attorney, Agent, or Firm* — Sughrue Mion, PLLC

(57) ABSTRACT

A method of measuring a direction between devices performing ultra-wide band (UWB) communication and each including a plurality of antennas includes transmitting signals through a plurality of antennas by a transmitting device and receiving the signals through a plurality of antennas by a receiving device, and selecting at least one of an angle of departure (AoD) method and an angle of arrival (AoA) method depending on statuses of the transmitting device and the receiving device and measuring the direction between the devices by using a selected method.

15 Claims, 13 Drawing Sheets

(56) References Cited

U.S. PATENT DOCUMENTS

| | | | | |
|---|---|---|---|---|
| 2022/0224385 | A1 | 7/2022 | Kotilainen | |
| 2022/0303680 | A1* | 9/2022 | Ahmed | H04R 3/12 |
| 2022/0386270 | A1* | 12/2022 | Suresh | G01S 5/08 |
| 2022/0397629 | A1 | 12/2022 | McLaughlin et al. | |
| 2023/0168336 | A1* | 6/2023 | Aldana | G01S 13/42<br>342/407 |
| 2023/0178901 | A1 | 6/2023 | Kim et al. | |
| 2023/0300775 | A1* | 9/2023 | Luong | H04W 64/00<br>455/456.1 |
| 2024/0064695 | A1* | 2/2024 | Suresh | G01S 3/48 |

FOREIGN PATENT DOCUMENTS

| | | | |
|---|---|---|---|
| JP | 2022-543179 | A | 10/2022 |
| KR | 10-2022-0017131 | A | 2/2022 |
| KR | 10-2022-0062066 | A | 5/2022 |
| WO | 2021/171824 | A1 | 9/2021 |

OTHER PUBLICATIONS

Korean Office Action dated Jan. 15, 2025 in Application No. 10-2023-0097798.

Sumin Han et al., "IEEE 802.15.4z UWB Angle of Departure Tag Design for Indoor Positioning", Proceedings of the 53rd European Microwave Conference, Sep. 19, 2023, pp. 075-078.

* cited by examiner

DIRECTION FINDING METHOD BASED ON UWB, AND ELECTRONIC DEVICE FOR PERFORMING THE SAME

CROSS-REFERENCE TO RELATED APPLICATION

This application is based on and claims priority under 35 U.S.C. § 119 to Korean Patent Application No. 10-2023-0097798, filed on Jul. 26, 2023, in the Korean Intellectual Property Office, the disclosure of which is incorporated by reference herein in its entirety.

BACKGROUND

1. Field

The disclosure relates to a method of finding a direction in a positioning technology based on ultra-wide band (UWB), and more particularly, to a method of finding a direction between UWB devices based on phase difference between signals transmitted and received through different antennas.

2. Description of the Related Art

Ultra-wide band (UWB) technology is a wireless technology that uses narrow pulses in the time domain and has a much wider bandwidth than existing wireless communication technologies in the frequency domain. According to definition of the Federal Communications Commission (FCC), UWB technology means using a frequency bandwidth of 500 MHz or more.

UWB technology may be used to establish short-range wireless personal networks and has been widely used in services using positioning due to the characteristics for measuring a distance between devices as well as wireless communication between devices.

High-rate pulse repetition frequency (HRP) UWB technology is a technology that uses a UWB symbol including a series of UWB pulses without using individual UWB pulses unlike the existing UWB technology and may improve the precision of distance measurement with the introduction of HRP UWB technology.

However, to provide a location-based service using HRP UWB technology, not only a distance between UWB devices (e.g., UWB anchor and UWB tags) but also a direction thereof needs to be found. Direction finding technology uses an antenna, and thus, direction finding technology was not introduced in the initial HRP UWB, and later direction finding was performed using a phase difference or arrival (PDoA) method, which uses a difference in arrival paths of radio waves received from two UWB antennas.

SUMMARY

Additional aspects will be set forth in part in the description which follows and, in part, will be apparent from the description, or may be learned by practice of the presented embodiments of the disclosure.

According to an aspect of the disclosure, a method of measuring a direction between devices performing ultra-wide band (UWB) communication and each including a plurality of antennas includes transmitting signals through a plurality of antennas by a transmitting device and receiving the signals through a plurality of antennas by a receiving device, and selecting at least one of an angle of departure (AoD) method and an angle of arrival (AoA) method depending on statuses of the transmitting device and the receiving device and measuring the direction between the devices by using a selected method, wherein the AoD method is a method of measuring an AoD of signals transmitted through two or more different antennas from the transmitting device based on a phase difference between the transmitted signals, and the AoA method is a method of measuring an AoA of signals received through two or more different antennas by the receiving device based on a phase difference between the received signals.

According to another aspect of the disclosure, a receiving device for performing direction finding based on ultra-wide band (UWB) includes an antenna module including a plurality of antennas arranged at half-wavelength intervals of a received signal, a memory configured to store a program therein for performing direction finding, and at least one processor, wherein the processor is configured to receive signals transmitted through a plurality of antennas from the transmitting device, select at least one of an angle of departure (AoD) method and an angle of arrival (AoA) method depending on statuses of the transmitting device and the receiving device and measure the direction between the devices by using a selected method, and the AoD method is a method of measuring an AoD of signals transmitted through two or more antennas from the transmitting device based on a phase difference between the transmitted signals and the AoA method is a method of measuring an AoA of signals received through two or more different antennas by the receiving device based on a phase difference between the received signals.

According to another aspect of the disclosure, a computer readable recording medium may have recorded thereon a program for executing the method.

According to another aspect of the disclosure, a computer program may be stored in a medium for performing at least one of the methods in a computer.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
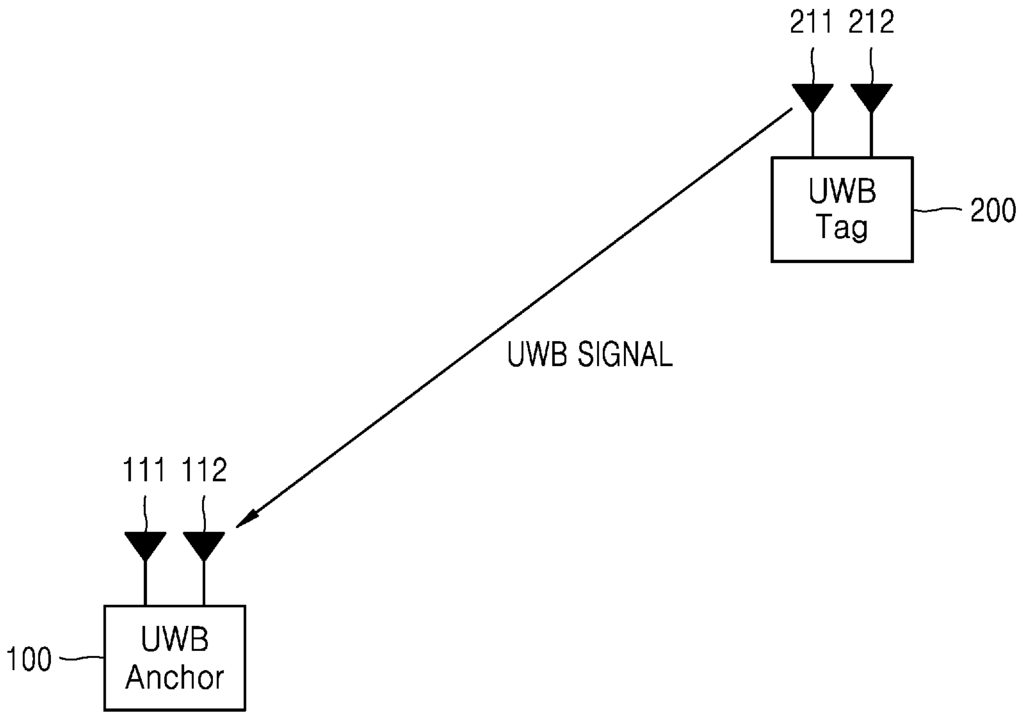
FIG. 1 is a diagram illustrating a system environment for performing direction measurement based on ultra-wide band (UWB), according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

With regard to the description of the disclosure, technical features that are not directly associated with the disclosure are not described here. Certain detailed explanations of related art are omitted for clarity when it is deemed that they may unnecessarily obscure the essence of the disclosure. The terms used in the specification are defined in consideration of functions used in the disclosure, and may be changed according to the intent or conventionally used methods of clients, operators, and users. Accordingly, definitions of the terms should be understood on the basis of the entire description of the present specification.

In the same reason, some components in the following drawings may be exaggerated, omitted, or schematically illustrated. The sizes of components do not reflect their actual sizes completely. The same reference number is given to the same or corresponding components in each drawing.

Advantages and features of the disclosure, and methods of achieving them may be clear with reference to the detailed description of the following embodiments taken in conjunction with the accompanying drawings. However, the disclosure is not limited to the embodiments disclosed below, but may be implemented in various different forms. These embodiments are intended to complete the disclosure, and are common in the art to which the disclosure belongs, and it is provided to fully inform the person skilled in the art of the scope of the disclosure. An embodiment is defined by the scope of the claims. Like reference numerals refer to like elements throughout the specification. In the following description of the disclosure, a detailed description of functions and configurations incorporated herein will be omitted when it may make the subject matter of the disclosure unclear. The following terms used in the specification are defined in consideration of functions used in the disclosure, and may be changed according to the intent or conventionally used methods of operators and users. Accordingly, definitions of the terms need to be understood on the basis of the entire description of the specification.

According to an embodiment, combinations of each block of flowcharts and the flowcharts may be performed by computer program instructions. Computer program instructions may be installed on a processor of a general computer, a special computer or other programmable data processing equipment, and the instructions executed through the processor of the computer or other programmable data processing equipment may generate an element for performing functions described in block(s) of flowcharts. Computer program instructions may be stored in computer available or computer readable memory that may aim for a computer or other data processing equipment to implement functions in a certain way, and instructions stored in the computer available or computer readable memory may also produce manufacturing items that contain instruction elements for performing the functions described in the block(s) of the flowcharts. It is also possible that computer program instructions are installed on a computer or other programmable data processing equipment.

Each block of flowcharts may indicate a part of a module, segment or code including one or more executable instruments for executing a certain logical function(s). According to an embodiment, it is also possible that functions mentioned in the blocks are performed out of order. For example, two blocks that are consecutively shown may actually be performed at the same time, or in reverse order depending on the function.

The term "unit" in an embodiment means a software component or a hardware component, such as a field programmable gate array (FPGA) or an application specific integrated circuit (ASIC), that performs a certain function. However, the term "unit" is not limited to software or hardware. The "unit" may be formed to be stored in an addressable storage medium, or may be formed to operate one or more processors. In an embodiment, the term "unit" may refer to components such as software components, object-oriented software components, class components, and task components, processes, functions, attributes, procedures, subroutines, segments of program code, drivers, firmware, micro code, circuits, data, databases, data structures, tables, arrays, and parameters. Functions provided by certain elements and a certain "unit" may be combined in a smaller number of elements or may be separated into additional elements. In an embodiment, the "unit" may include one or more processors.

Prior to describing certain embodiments, the terms frequently used in the disclosure will be described.

In the disclosure, "direction finding" or "direction measurement" refers to an operation of identifying a direction of a device transmitting a signal (radio wave) based on a direction of the signal. According to an embodiment, an operation of finding relative directions between devices performing ultra-wide band (UWB) communication is performed. For example, a UWB device that receives a signal may find a direction of a UWB device (direction based on the UWB device receiving a signal) that transmits the signal by measuring an angle of arrival of the signal.

The "angle of departure (AoD) method" may refer to a method of measuring an AoD of signals transmitted from a transmitting device through two or more different antennas based on a phase difference between the transmitted signals.

The "angle of arrival (AoA) method" may refer to a method of measuring an AoA of signals received by a receiving device through two or more different antennas based on a phase difference between the received signals.

Hereinafter, detailed embodiments will be described with reference to the drawings. First, with reference to FIG. 1, a UWB communication system to which embodiments are applicable will be described.

FIG. 1 is a diagram illustrating a system environment for performing direction measurement based on a UWB, according to an embodiment. Referring to FIG. 1, a system may include two UWB devices such as a UWB anchor 100 and a UWB tag 200. The UWB tag 200 is referred to as a transmitting device because the UWB tag 200 transmits a signal during positioning, and the UWB anchor 100 is referred to as a receiving device because the UWB anchor 100 receives a signal during positioning.

According to an embodiment, the UWB anchor 100 and the UWB tag 200 may each include a plurality of antennas to use both the AoD and AoA methods. In the embodiment shown in FIG. 1, the UWB anchor 100 includes two antennas 111 and 112, and the UWB tag 200 also includes two antennas 211 and 212. The UWB anchor 100 or the UWB tag 200 may include three or more antennas. The system may be configured to include a plurality of UWB anchors 100 and a plurality of UWB tags 200.

The UWB tag 200 may provide position information to the UWB anchor 100. Therefore, in the following embodiments, when the UWB tag 200 transmits a signal (a radio wave) to the UWB anchor 100, the UWB anchor 100 may identify a position (a distance and a direction) of the UWB tag 200 based on a received signal.

According to an embodiment, the UWB anchor 100 may measure a distance from the UWB tag 200 by using a two-way ranging (TWR) method using a time of flight (ToF) that is a time during which a signal is transmitted and received between two devices. The UWB anchor 100 may measure a distance between the UWB anchor 100 and the UWB tag 200 by using various other methods. The TWR method is known technology and the disclosure relates to a direction finding method between the UWB devices 100 and 200, and thus a detailed description of a distance measurement method is omitted.

According to an embodiment, to use the AoA method, the antennas 111 and 112 of the UWB anchor 100 may be installed apart by a half-wavelength distance of the received signal. Similarly, according to an embodiment, to use the AoD method, the antennas 211 and 212 of the UWB tag 200 may be installed apart by a half-wavelength distance of the transmitted signal.

In the embodiment shown in FIG. 1, when the UWB tag 200 switches the two antennas 211 and 212 and transmits signals (UWB signals), the UWB anchor 100 may receive signals through any one of the two antennas 111 and 112 and obtain an AoD (an angle at which a signal departs from the UWB tag 200) of the signals by using the AoD method. When the UWB tag 200 transmits signals through any one of the two antennas 211 and 212, the UWB anchor 100 may switch the two antennas 111 and 112 to receive the signals and obtain an AoA (an angle at which a signal reaches the UWB anchor 100) of the signals by using the AoA method. A method in which the UWB anchor 100 measures an AoD of signals by using the AoD method or measures an AoA of the signals by using the AoA method will be described below in detail with reference to FIG. 3.

According to embodiments, various technical effects may be expected using both the AoD and AoA methods. First, when one of the two devices 100 and 200 moves, the UWB anchor 100 may measure an angle of orientation of the moving device. In this case, the angle of orientation may mean a direction in which a moving device is oriented (e.g., a direction in which an antenna of the moving device is oriented). Second, a range in which the UWB anchor 100 is capable of measuring a direction may be wider than that of using one method alone. Third, the UWB anchor 100 may not need to correct a direction due to a change in an angle of orientation of a moving device by selecting a direction measurement method depending on which of the two devices 100 and 200 moves. Embodiments for obtaining the above three effects will be described below in detail with reference to FIGS. 7 to 9B.

Figure 2:
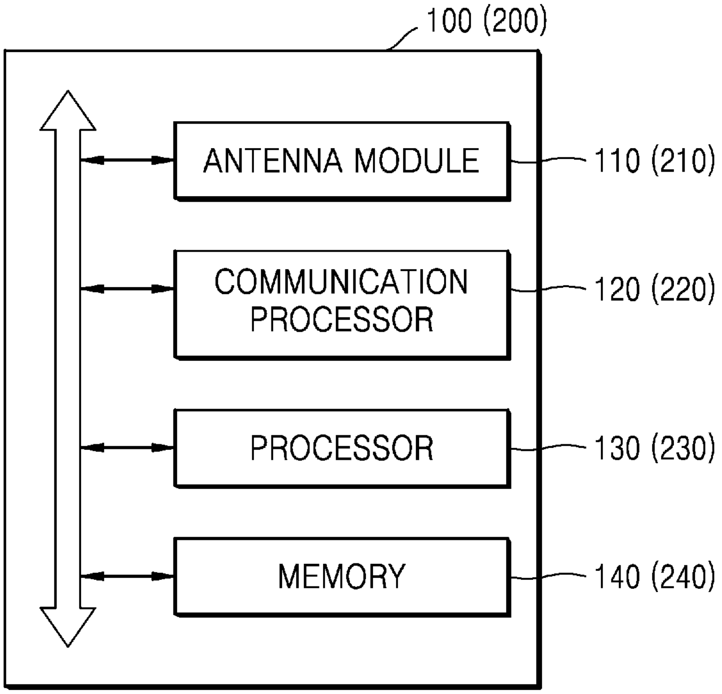
FIG. 2 is a diagram for explaining components included in a UWB device, according to an embodiment.

FIG. 2 is a diagram for explaining components included in a UWB device, according to an embodiment. FIG. 2 illustrates components that are commonly included in the UWB anchor 100 and the UWB tag 200.

Referring to FIG. 2, the UWB devices 100 and 200 may include antenna modules 110 and 210, communication processors 120 and 220, processors 130 and 230, and memories 140 and 240.

The antenna modules 110 and 210 are each a component configured to transmit and receive signals (radio waves). As shown in FIG. 1, the antenna modules 110 and 210 may include a plurality of antennas 111, 112, 211, and 212. The plurality of antennas 111, 112, 211, and 212 may be installed apart by half a wavelength of a signal transmitted and received between the UWB devices 100 and 200. That is, the antenna modules 110 and 210 may be a linear array antenna or a circular array antenna in which a plurality of antennas are arranged at half-wavelength intervals.

The communication processors 120 and 220 are each a component configured to communicate with other external devices. According to an embodiment, the communication processors 120 and 220 may include at least one receiver and at least one transmitter, and may include a switch (e.g., RF switch) that connects the antenna modules 110 and 210 to any one of the receiver or the transmitter. The communication processors 120 and 220 may each include a switch (e.g., RF switch) configured to change an antenna that receives (transmits) a signal among the plurality of antennas 111, 112, 211, and 212 included in the antenna modules 110 and 210.

According to an embodiment, the communication processor 220 included in the UWB tag 200 may include a single pole double throw (SPDT) switch (not shown) configured to connect one transmitter (not shown) and two antennas 211 and 212 to each other. In this case, the SPDT switch rarely consumes power, and thus the UWB tag 200 has little additional power consumption compared to the case of one antenna alone. The communication processor 220 of the UWB tag 200 may transmit a signal while switching the two antennas 211 and 212, and thus the UWB anchor 100 may measure a direction of the UWB tag 200 through an AoD method. A process in which the UWB tag 200 transmits signals (packets) while switching the antennas 211 and 212 when using the AoD method will be described below in detail with reference to FIGS. 4 and 5.

The processors 130 and 230 are each a component configured to control a series of processes to allow the UWB devices 100 and 200 to operate according to embodiments described below, and may include one or a plurality of processors. In this case, one or a plurality of processors include a general-purpose processor such as a CPU, an application processor (AP) and a digital signal processor (DSP), a graphic dedicated processor such as a GPU and a vision processing unit (VPU), or an artificial intelligent dedicated processor such as a neural processing unit (NPU). For example, when one or a plurality of processors are an artificial intelligent dedicated processor, the artificial intelligent dedicated processor may be designed as a hardware structure specialized in processing of a certain artificial intelligent model.

The processors 130 and 230 may record data in the memories 140 and 240 to be described below, or read the data stored in the memories 140 and 240, and in particular, process data according to a predefined operation rule or an artificial intelligent model by executing a program stored in the memories 140 and 240. Therefore, the processors 130 and 230 may perform operations described in the following embodiments, and it may be seen that the operations described to be performed by the UWB devices 100 and 200 in the following embodiments are performed by the processors 130 and 230 unless otherwise stated.

In FIG. 2, the communication processors 120 and 220 and the processors 130 and 230 are shown to be separately present, but the communication processors 120 and 220 may also be included in the processors 130 and 230.

The memories 140 and 240 are each a component configured to store various programs or data, and may include a storage medium such as ROM, RAM, hard disk, and CD-ROM and DVD, or a combination of storage media. The memories 140 and 240 may not exist separately but may be configured to be included in the processors 130 and 230. The memories 140 and 240 may include a volatile memory, a nonvolatile memory, or a combination of the volatile memory and the nonvolatile memory. A program for performing operations according to embodiments described below may be stored in the memories 140 and 240. The memories 140 and 240 may provide the stored data to the processors 130 and 230 in response to a request of the processors 130 and 230.

Figure 3:
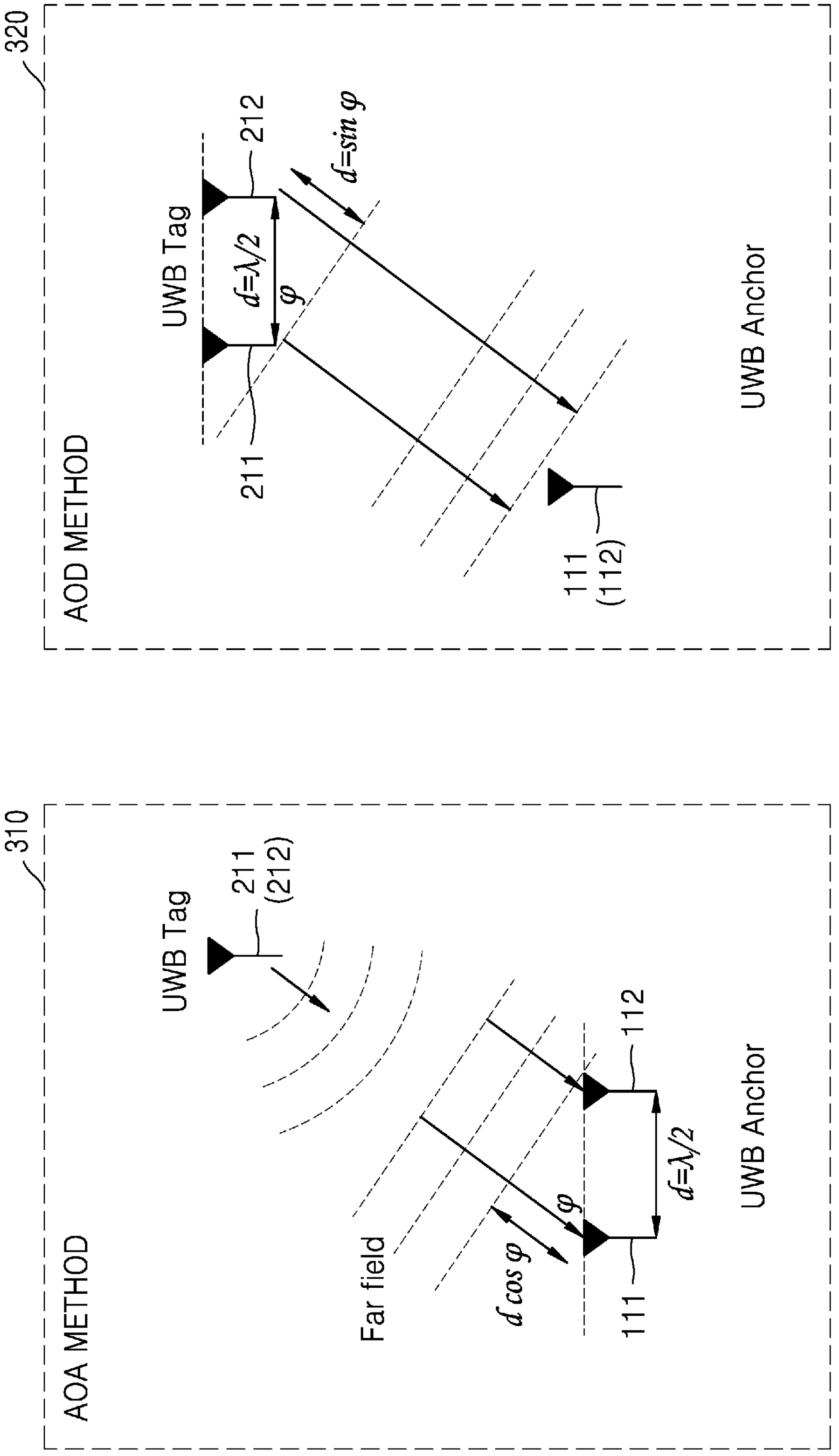
FIG. 3 is a diagram for explaining a method of measuring an angle of arrival (AoA) by using an AoA method by UWB devices and a method of measuring an angle of departure (AoD) by using an AoD method, according to an embodiment.

FIG. 3 is a diagram for explaining a method in which UWB devices measure an AoA by using an AoA method and measure an AoD by using an AoD method, according to an embodiment. FIG. 3 illustrates antennas alone installed in a device to clearly indicate portions needed for the description.

Both the AoA and AoD methods correspond to a phase difference of arrival (PDoA) method of measuring an AoA or an AoD of a signal based on a phase difference due to a length difference between transmission paths of signals received by the UWB anchor 100.

A diagram for explaining the AoA method is illustrated in a first area 310 of FIG. 3, and a diagram for explaining the AoD method is illustrated in a second area 320 of FIG. 3.

First, the AoA method will be described with reference to the first area 310.

When the UWB tag 200 transmits carrier wave signals with a wavelength A through one antenna 211 or 212, the UWB anchor 100 may receive the signals through the two antennas 111 and 112. When the UWB anchor 100 is located in a far field, AoA φ of signals incident on the two antennas 111 and 112 may be assumed to be the same. A length difference d cos ϕ between transmission paths is generated depending on an AoA φ of the signals incident on the two antennas 111 and 112, and accordingly, a phase difference between the signals is generated. A direction of the UWB tag 200 based on the UWB anchor 100 may be represented by an AoA φ.

A distance d between the two antennas 111 and 112 is a half wavelength λ/2, and thus a phase difference Δθ between the signals incident on the two antennas 111 and 112 is represented using Equation 1 below.

$$\Delta\theta = 2\pi\frac{d\cos\phi}{\lambda} = \pi\cos\phi \qquad \text{Equation 1}$$

From Equation 1, a direction of the UWB tag 200, that is, an AoA φ may be represented using Equation 2 below.

$$\phi = \cos^{-1}\left(\frac{\Delta\theta}{\pi}\right) \qquad \text{Equation 2}$$

Hereinafter, the AoD method will be described with reference to the second area 320.

When the UWB tag 200 transmits carrier signals with a wavelength A through the two antennas 211 and 212, the UWB anchor 100 may receive the signals through one antenna 111 or 112. A length difference d sin φ between transmission paths is generated depending on an AoD φ of signals transmitted from the two antennas 211 and 212, and accordingly, a phase difference between the signals is generated. A direction of the UWB tag 200 based on the UWB anchor 100 may be represented by an AoD φ.

When the phase difference between the signals transmitted from the two antennas 211 and 212 is Δθ, a direction of the UWB tag 200, that is, an AoD φ may be represented using Equation 3 below according to a principle similar to the AoA method.

$$\phi = \sin^{-1}\left(\frac{\Delta\theta}{\pi}\right) \qquad \text{Equation 3}$$

According to an embodiment, as shown in FIG. 1, both the UWB anchor 100 and the UWB tag 200 include a plurality of antennas, and thus a direction between the UWB devices 100 and 200 may be measured by selectively selecting any one of the AoA and AoD methods described above or by simultaneously using the two methods.

To use the AoD method, the UWB tag 200 needs to transmit signals by using the two antennas 211 and 212. Hereinafter, with reference to FIGS. 4 and 5, a method in which the UWB tag 200 transmits a signal while switching the antennas 211 and 212 will be described.

Figure 4:
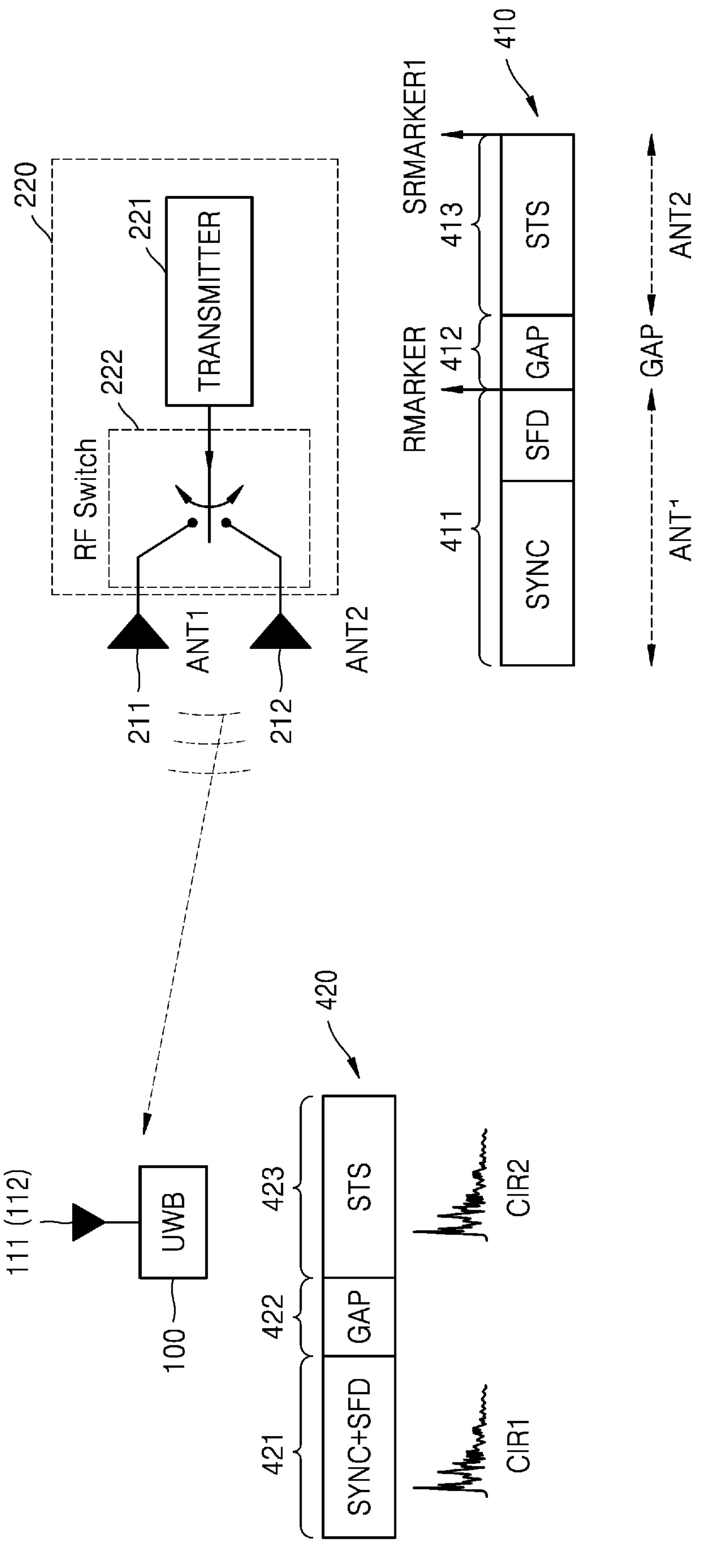
FIG. 4 is a diagram for explaining a method of transmitting a packet by using different antennas for respective segments by a UWB device to which an AoD method is applied, according to an embodiment.

FIG. 4 is a diagram for explaining a method of transmitting a packet by using different antennas for respective segments by a UWB device to which an AoD method is applied, according to an embodiment. Referring to FIG. 4, the communication processor 220 of the UWB tag 200 may include a transmitter 221 and an RF switch 222. The RF switch 222 may connect the antennas 211 and 212 and the transmitter 221 included in the antenna module 210 and switch the two antennas 211 and 212 during signal transmission.

In the embodiment shown in FIG. 4, it is assumed that the UWB tag 200 switches the antennas 211 and 212 and transmits a transmitting packet 410. The transmitting packet 410 may include a preamble segment 411, a gap segment 412, and a scrambled timestamp sequence (STS) segment 413. For reference, the STS is a field of an encryption function that is added in IEEE 802.15.4z-2020 HRP UWB standardized in 2020.

According to an embodiment, the communication processor 220 of the UWB tag 200 may control the RF switch 222 to transmit the transmitting packet 410 through different antennas for respective segments. For example, the communication processor 220 may control the RF switch 222 to transmit the preamble segment 411 through a first antenna 211 and transmit the STS segment 413 through a second antenna 212. To this end, the communication processor 220 may control the RF switch 222 to switch from the first antenna 211 to the second antenna 212 in the gap segment 412. A process in which the communication processor 220 switches the antennas 211 and 212 for each segment of the transmitting packet 410 will be described in detail with reference to FIG. 5.

Figure 5:
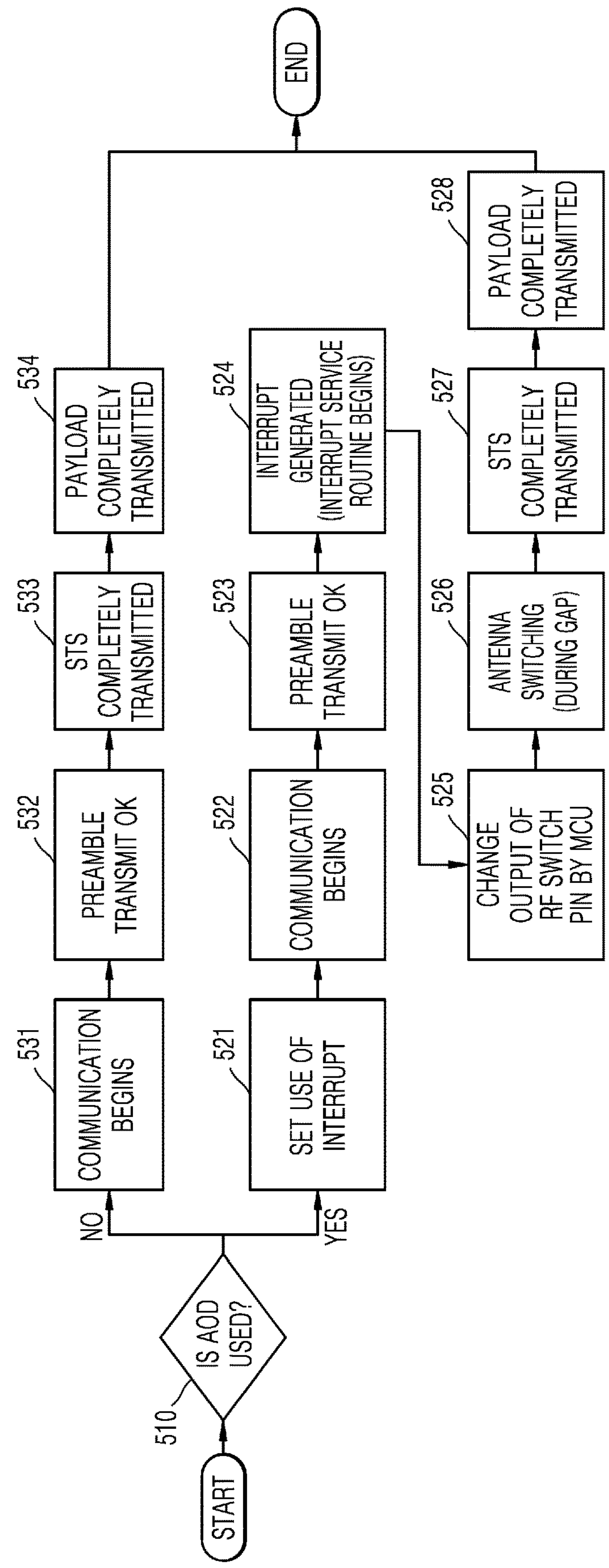
FIG. 5 is a flowchart for explaining a process of switching an antenna depending on whether a UWB device uses an AoD method, according to an embodiment.

FIG. 5 is a flowchart for explaining a process of switching an antenna depending on whether a UWB device uses an AoD method, according to an embodiment. Referring to FIG. 5, in operation 510, the communication processor 220 of the UWB tag 200 determines whether to use the AoD method. Whether to use the AoD method may be determined by user setting, and may be determined according to statuses of the UWB anchor 100 and the UWB tag 200 as in the embodiments described in the disclosure. (For example, when the UWB anchor 100 moves, the AoD method may be used, and when the UWB tag 200 moves, the AoD method may not be used.)

When the AoD method is determined to be used in operation 510, the communication processor 220 may perform operation 521 to set use of interrupt. For example, the communication processor 220 may set an interrupt request (IRQ) pin signal to be generated when the preamble segment 411 of the transmitting packet 410 is completely transmitted.

When communication starts in operation 522, the communication processor 220 may begin to transmit the transmitting packet 410 through the first antenna 211 of the plurality of antennas 211 and 212. When confirming that the preamble segment 411 is completely transmitted in operation 523, the communication processor 220 may generate interrupt (IRQ pin signal) in operation 524. When receiving the IRQ pin signal in operation 525, a micro controller unit (MCU) included in the communication processor 220 may change output of a pin of the RF switch 222 to perform antenna switching (an antenna connected to the transmitter 221 is changed from the first antenna 211 to the second antenna 212) in operation 526.

Operations 524 to 526 may be performed during the gap segment 412 of the transmitting packet 410. Therefore, the STS segment 413 after the gap segment 412 may be transmitted through the second antenna 212 in operation 527. After the operations, payload transmission may be completed in operation 528.

When it is determined that the AoD method is not used in operation 510, the communication processor 220 may perform operation 531 to start communication while transmitting the transmitting packet 410 through any one of the plurality of antennas 211 and 212. When confirming that the preamble segment 411 is completely transmitted in operation 532, the communication processor 220 may transmit the STS segment 413 in operation 533. In this case, the communication processor 220 transmits the preamble segment 411 and the STS segment 413 through the same antenna 211 or 212. In operation 534, the transmission process may be terminated by completing the payload transmission.

As such, when transmission of a certain segment of the transmitting packet 410 is completed while using the AoD method, interrupt is generated, and thus the communication processor 220 of the UWB tag 200 may transmit the transmitting packet 410 through different antennas for respective segments by setting a transmitting antenna to be switched.

Referring back to FIG. 4, when the UWB tag 200 switches the plurality of antennas 211 and 212 and transmits the transmitting packet 410, the UWB anchor 100 may receive a receiving packet 420 through any one of the plurality of antennas 111 and 112. The transmitting packet 410 and the receiving packet 420 are substantially the same packet, but are named differently at a transmitting end and a receiving end. Thus, the receiving packet 420 may also include a preamble segment 421, a gap segment 422, and an STS segment 423.

The UWB anchor 100 may obtain a channel impulse response (CIR) for each segment of the receiving packet 420. The UWB anchor 100 may obtain a first CIR CIR1 for the preamble segment 421 of the receiving packet 420, and obtain a second CIR CIR2 for the STS segment 423. The UWB anchor 100 may obtain a phase difference between the first CIR CIR1 and the second CIR CIR2 and calculate an AoD of a signal in the UWB tag 200 based on the phase difference. The method in which the UWB anchor 100 obtains an AoD of a signal based on a phase difference is the same as the above description given with reference to FIG. 3.

According to an embodiment, the UWB anchor 100 may measure a direction of the UWB tag 200 by simultaneously using the AoA and AoD methods. Hereinafter, with reference to FIG. 6, transmission and reception for each segment of a packet and comparison in the phase difference when the UWB anchor 100 uses the AoA method and the AoD method at the same time will be described in detail.

Figure 6:
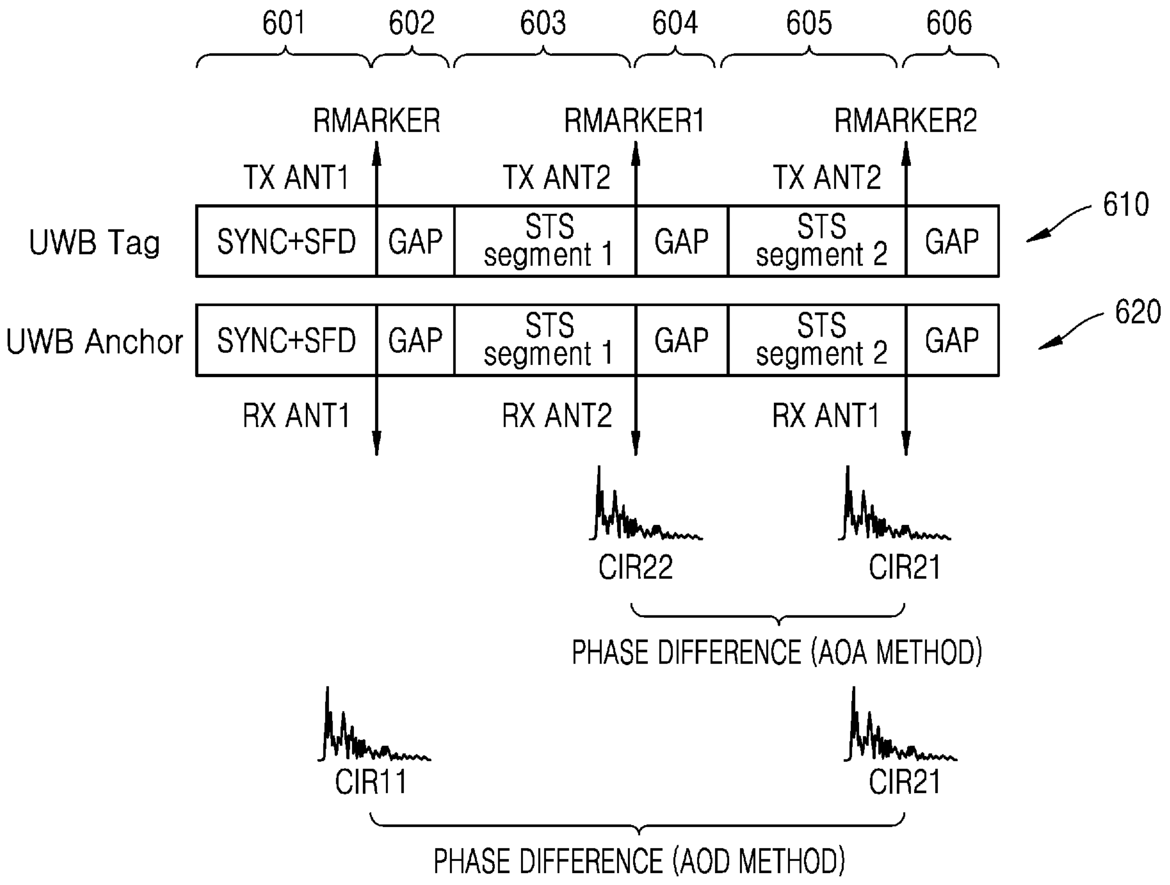
FIG. 6 is a diagram for explaining a method of comparing a phase difference between signals when a UWB device uses an AoA method and an AoD method at the same time, according to an embodiment.

FIG. 6 is a diagram for explaining a method of comparing a phase difference between signals when a UWB device uses an AoA method and an AoD method at the same time, according to an embodiment. Referring to FIG. 6, the UWB tag 200 may transmit a transmitting packet 610 by using a first transmitting antenna TX ANT1 and a second transmitting antenna TX ANT2, and the UWB anchor 100 may receive a receiving packet 620 by using a first receiving antenna RX ANT1 and a second receiving antenna RX ANT2. Both the transmitting packet 610 and the receiving packet 620 may each include a preamble segment 601, a first gap segment 602, a first STS segment 603, a second gap segment 604, a second STS segment 605, and a third gap segment 606. The UWB tag 200 may switch the antennas TX ANT1 and TX ANT2 to transmit a packet by using different antennas for respective segments of the transmitting packet 610. Similarly, the UWB anchor 100 may switch the antennas RX ANT1 and RX ANT2 to receive a packet by using different antennas for respective segments of the receiving packet 620.

First, with regard to a process of transmitting the transmitting packet 610 by the UWB tag 200, the UWB tag 200 may transmit the preamble segment 601 by using the first transmitting antenna TX ANT1. Then, when the UWB tag 200 switches an antenna to the second transmitting antenna TX ANT2 from the first transmitting antenna TX ANT1 during the first gap segment 602, both the first STS segment 603 and the second STS segment 605 may be transmitted through the second transmitting antenna TX ANT2.

With regard to a process of receiving the receiving packet 620 by the UWB anchor 100, the UWB anchor 100 may receive the preamble segment 601 by using the first receiving antenna RX ANT1. Then, when the UWB anchor 100 switches an antenna to the second receiving antenna RX ANT2 from the first receiving antenna RX ANT1 during the first gap segment 602, the first STS segment 603 may be received through the second receiving antenna RX ANT2. Then, when the UWB anchor 100 switches an antenna to the first receiving antenna RX ANT1 from the second receiving antenna RX ANT2 during the second gap segment 604, the second STS segment 605 may be received through the first receiving antenna RX ANT1.

The UWB anchor 100 may obtain a CIR for each segment when the receiving packet 620 is completely received. In the embodiment shown in FIG. 6, a CIR corresponding to the preamble segment 601 is referred to as a 11th CIR CIR11, a CIR corresponding to the first STS segment 603 is referred to as a 22th CIR CIR22, and a CIR corresponding to the second STS segment 605 is referred to as a 21st CIR CIR21.

The UWB anchor 100 may measure a direction of the UWB tag 200 by using the AoA or AoD method by obtaining a phase difference between the obtained CIRs CIR11, CIR22, and CIR21.

To use the AoA method, a phase difference between two packets transmitted through the same antenna and received through different antennas is required. Accordingly, the UWB anchor 100 may obtain a phase difference between the 22th CIR CIR22 and the 21st CIR CIR21 and obtain (calculate) an AoA of a signal based on the phase difference.

To use the AoD method, a phase difference between two packets transmitted through different antennas and received through the same antenna is required. Accordingly, the UWB anchor 100 may obtain a phase difference between the 11th CIR CIR11 and the 21st CIR CIR21 and obtain (calculate) an AoD of a signal based on the phase difference.

As such, the UWB anchor 100 may measure a direction of the UWB tag 200 by using the AoA and AoD methods by transmitting and receiving a plurality of segments included in a packet through various combinations of antennas. However, a switching timing of transmitting and receiving antennas in the embodiment shown in FIG. 6 is merely an embodiment and may be configured in many different ways.

As described above, the system that may use both the AoA and AoD methods according to an embodiment may obtain various technical effects. In particular, the following effects may be obtained by selecting at least one of the AoA and AoD methods and measuring a direction according to statuses of the UWB devices 100 and 200.

1. Measurement of Angle of Orientation of Moving Device

When using the AoA and AoD methods at the same, a UWB-based direction measurement system may measure an angle of orientation of a moving device. Detailed description will be given with reference to FIG. 7.

Figure 7:
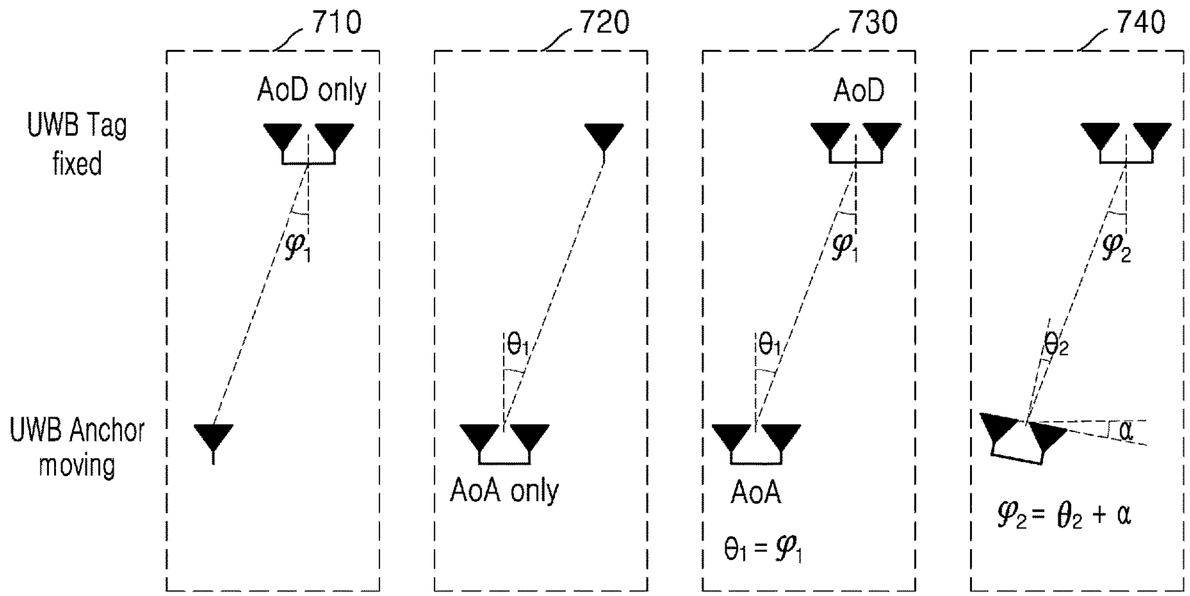
FIG. 7 is a diagram for explaining a method of measuring an angle of orientation of a moving device when a UWB device uses an AoA method and an AoD method at the same time, according to an embodiment.

FIG. 7 is a diagram for explaining a method of measuring an angle of orientation of a moving device when a UWB device uses an AoA method and an AoD method at the same time, according to an embodiment. FIG. 7 illustrates antennas alone included in each device to clearly show portions needed for the description. In the embodiment shown in FIG. 7, it is assumed that the UWB anchor 100 alone moves while the UWB tag 200 is stationary.

With reference to the diagrams of a first area 710 to a third area 730, an AoD and an AoA that are measured through at least one of AoA and AoD methods in a state in which angles of orientation of the UWB tag 200 and the UWB anchor 100 are the same will be described.

In a situation shown in the first area 710, the UWB anchor 100 uses the AoD method alone, and thus the UWB anchor 100 may measure an AoD $\varphi_1$ alone of a signal. In contrast, in a situation shown in a second area 710, the UWB anchor 100 may use the AoA method alone, and thus the UWB anchor 100 may measure an AoA $\theta_1$ alone of a signal. In a situation shown in the third area 730, the UWB anchor 100 may use the AoA and AoD methods at the same time, and thus may measure both the AoD $\varphi_1$ and the AoA $\theta_1$ of a signal.

It may be seen that, in the situation shown in the third area 730, antennas of the UWB tag 200 and the UWB anchor 100 are sorted, that is, angles of orientation of the UWB tag 200 and the UWB anchor 100 are the same, and thus the AoD $\varphi_1$ and the AoA $\theta_1$ are the same.

When an angle of orientation of the UWB anchor 100 changes as the UWB anchor 100 moves, an AoD and an AoA of a signal may be changed. In a situation shown in a fourth area 740, an angle of orientation of the UWB anchor 100 may be changed while the UWB anchor 100 moves. The UWB anchor 100 may measure both an AoD $\varphi_2$ and an AoA $\theta_2$ by using the AoA method and the AoD method at the same time. In this case, the AoD $\varphi_2$ and the AoA $\theta_2$ may be different from each other because the UWB anchor 100 and the UWB tag 200 have different angles of orientation. When an angle of orientation of the UWB anchor 100 based on an angle of orientation of the UWB tag 200 is a, a relationship in which the sum of the angle of orientation $\alpha$ and the AoA $\theta_2$ is the AoD $\varphi_2$ is satisfied. Accordingly, the UWB anchor 100 may measure the AOD $\varphi_2$ and the AoA $\theta_2$ by using the AoA and AoD methods and calculate the angle of orientation $\alpha$ of the UWB anchor 100 therefrom.

FIG. 7 illustrates an embodiment in which an angle of orientation of the UWB anchor 100 is calculated while the UWB tag 200 is stationary and the UWB anchor 100 moves, but in contrast, an angle of orientation of the UWB tag 200 may be calculated while the UWB anchor 100 is stationary and the UWB tag 200 moves. In the same principle, the UWB anchor 100 may use the AoA and AoD methods simultaneously to obtain both an AoD and an AoA and calculate the angle of orientation of the UWB tag 200 by using the AoD and the AoA.

2. Expansion of Range of Direction Measurement

When a UWB device including two antennas installed therein measures an AoA or an AoD of a signal by using an AoA method or an AoD method, a degree by which an angle (AoA or AoD) changes depending on a change in a phase difference is constant in a range of an AoA or an AoD within 45 degrees, but in the other range, the change in the phase difference depending on the change of the angle is small, and thus errors increasingly occur during direction measurement. Therefore, when the direction is measured using either the AoA method or the AoD method, more than two antennas are needed to expand a range in which the direction is measurable with accuracy at a certain level or higher.

According to an embodiment, a range of a measurable direction (AoA or AoD) may be expanded by using the AoA and AoD methods at the same time in a UWB-based positioning system. Detailed description will be given with reference to FIG. 8.

Figure 8:
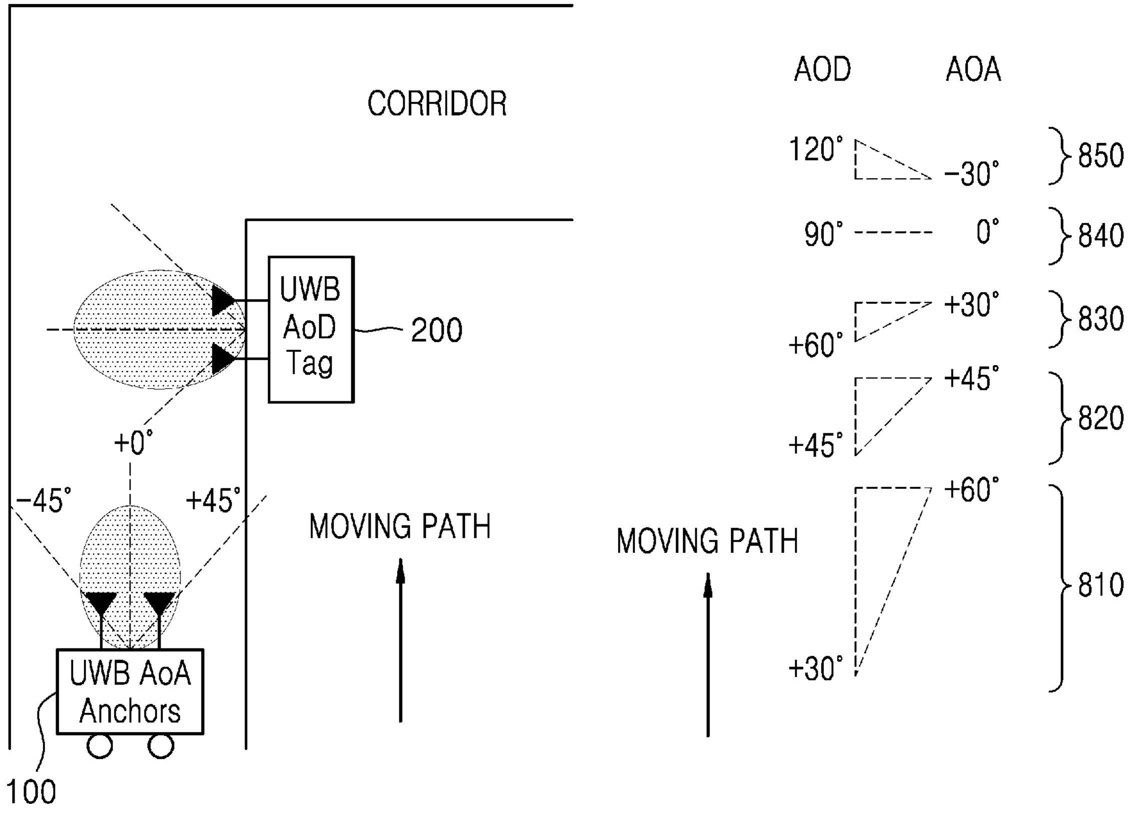
FIG. 8 is a diagram for explaining an effect of enlarging a range of a measurable direction by using AoA and AoD methods at the same time in a UWB-based positioning system, according to an embodiment.

FIG. 8 is a diagram for explaining an effect of enlarging a range of a measurable direction by using AoA and AoD methods at the same time in a UWB-based positioning system, according to an embodiment.

In the embodiment shown in FIG. 8, an angle of orientation of the UWB anchor 100 and an angle of orientation of the UWB tag 200 may form a right angle. As such, when an angle defined by the angles of orientation of the devices 100 and 200 is a right angle, a method according to the present embodiment may be applied. Even if the angle defined by the angles of orientation of the devices 100 and 200 is not a right angle, when the angle is within a certain range (e.g., +30 degrees from −30 degrees) and the UWB anchor 100 knows the angle (the angle defined by the angles of orientation of the two devices), the method according to the present embodiment may be applied. For example, the UWB anchor 100 may measure the angle defined by the angles of orientation of the two devices 100 and 200 by using the method described above with reference to FIG. 7. The reason for limiting the angle defined by the angles of orientation of the devices 100 and 200 is limited to a certain range because an effect of expanding a direction measurement range is almost eliminated when the angle defined by the angles of orientation is out of the certain range. (For example, when the angle defined by the angles of orientation of the devices 100 and 200 is 0 degree or 180 degrees)

Referring to FIG. 8, the UWB anchor 100 supports the AoA method, and the UWB tag 200 supports the AoD method. Thus, the UWB anchor 100 may measure both the AoA and the AoD of a signal received from the UWB tag 200.

A process of finding a direction by the UWB anchor 100 will be described below in detail.

When receiving signals from the UWB tag 200, the UWB anchor 100 may measure an AoD of signals by using the AoD method and measure an AoA of the signals by using the AoA method.

The UWB anchor 100 may select a method to be used in direction measurement based on the measured AoD and AoA. According to an embodiment, the UWB anchor 100 may select a method to be used in direction measurement based on the result obtained by comparing the sizes of the AoD and the AoA with a preset first reference value and a preset second reference value, respectively. In this case, the first reference value and the second reference value may be the same.

A detailed process will be described assuming that the angle defined by the angles of orientation of the UWB anchor 100 and the UWB tag 200 is a right angle and the first reference value and the second reference value are each 45 degrees as shown in FIG. 8.

As the result obtained by measuring the AoD and the AoA, when the size of the AoD is less than or equal to the first reference value (45 degrees), the UWB anchor 100 may select the AoD method, and when the size of the AoA is less than or equal to the second reference value (45 degrees), the UWB anchor 100 may select the AoA method. As described above, this is because, when the size of an angle (AoD or AoA) during direction measurement using two antennas is less than 45 degrees, high accuracy is expected.

When the sizes of the AoD and the AoA that are measured by the UWB anchor 100 are less than or equal to the first reference value (45 degrees) and the second reference value (45 degrees), respectively, the UWB anchor 100 may select either the AoA method or the AoD method through size comparison between the AoD and the AoA. According to an embodiment, the UWB anchor 100 may select a measurement method corresponding to a smaller angle of the measured AoD and AoA. For example, when the size of the AoD is less than that of the AoA from the measured AoD and AoA, the UWB anchor 100 may select the AoD method. This is because the accuracy increases as the measured angle reduces.

In contrast, when the sizes of the AoD and the AoA that are measured by the UWB anchor 100 are greater than the first reference value (45 degrees) and the second reference value (45 degrees), respectively, the UWB anchor 100 may select either the AoD method or the AoA method through size comparison between the AoD and the AoA. According to an embodiment, in this case, the UWB anchor 100 may also select a measurement method corresponding to a smaller angle of the measured AoD and AoA. For example, when the size of the AoA is less than that of the AoD from the measured AoD and AoA, the UWB anchor 100 may select the AoA method. This is also because the accuracy increases as the measured angle reduces.

According to an embodiment, the UWB anchor 100 may measure the AoD and the AoA and may then select either the AoA method or the AoD method through size comparison between the AoD and the AoA without a process of comparing the sizes of the AoD and the AoA with a reference value. For example, when the size of the AoA is less than that of the AoD from the measured AoD and AoA, the UWB anchor 100 may select the AoA method.

A right side of FIG. 8 shows an example in which an AoD and an AoA of a signal received from the UWB tag 200 change as the UWB anchor 100 moves forward. The AoD and AoA shown in FIG. 8 may correspond to actual exact values, and an AoD and AoA measured by the UWB anchor 100 may be different from values shown in FIG. 8 due to errors.

At a first position 810, an AoD of a signal is 60 degrees and an AoA of the signal is 30 degrees. In this case, the AoD and AoA measured by the UWB anchor 100 may be different from actual values due to errors. For example, the AoD and the AoA that are measured at the first position 810 by the UWB anchor 100 are assumed to be 68 degrees and 31 degrees, respectively. (The AoD has relatively large errors than the AoA because the size of the AoD exceeds 45 degrees) The UWB anchor 100 may compare the measured AoD (68 degrees) with the first reference value (45 degrees) and compare the measured AoA (31 degrees) with the second reference value (45 degrees). The size of the AoA (31 degrees) is less than or equal to the second reference value (45 degrees), and thus the UWB anchor 100 may select the AoA method as a method to be used in direction measurement. Alternatively, according to an embodiment, the size of the measured AoD (68 degrees) is compared with that of the AoA (31 degrees) and the size of the AoA (31 degrees) is less than that of the AoD, and thus the UWB anchor 100 may select the AoA method.

The UWB anchor 100 may measure a direction by using the selected AoA method. For example, the UWB anchor 100 may not measure an AoA again, but may disregard the AoD (68 degrees) from the aforementioned AoD and AoA and select the AoA (31 degrees) (selection of the AoA method). The UWB anchor 100 may estimate an AoD as 59 degrees based on the selected AoA (31 degrees) and determine a direction of the UWB tag 200 depending on the obtained AoA (31 degrees) and AoD (59 degrees).

At a second position 820, both an AoD and an AoA of a signal are 45 degrees. The AoD and AoA measured by the UWB anchor 100 may be different from actual values due to errors. As such, when the AoD and the AoA are close to the first reference value (45 degrees) and the second reference value (45 degrees), respectively, various situations may occur as follows.

(1) When any One Alone of the Measured AoD and AoA Satisfies the Range

For example, the AoD and the AoA that are measured at the second position 820 by the UWB anchor 100 are assumed to be 44 degrees and 47 degrees, respectively. The UWB anchor 100 may compare the measured AoD (44 degrees) with the first reference value (45 degrees) and compare the measured AoA (47 degrees) with the second reference value (45 degrees). The size of the AoD (44 degrees) is less than or equal to the first reference value (45 degrees), and thus the UWB anchor 100 may select the AoD method as a method to be used in direction measurement. That is, the UWB anchor 100 may select the AoD (44 degrees), estimate the AoA as 46 degrees based on the AoD (44 degrees), and determine a direction of the UWB tag 200 according to the obtained AoD (44 degrees) and AoA (46 degrees).

For example, assuming that the AoA and the AoA that are measured at the second position 820 by the UWB anchor 100 are 46 degrees and 43 degrees, respectively, the size of the AoA (43 degrees) is less than or equal to the second reference value (45 degrees), and thus the UWB anchor 100 may select the AoA method to be used for direction measurement. That is, the UWB anchor 100 may select the AoA (43 degrees), estimate the AoD as 47 degrees based on the AoA (43 degrees), and determine a direction of the UWB tag 200 according to the obtained AoD (47 degrees) and AoA (43 degrees).

(2) When Both the Measured AoD and AoA Satisfy the Range

For example, the AoD and the AoA that are measured at the second position 820 by the UWB anchor 100 are assumed to be 44 degrees and 43 degrees, respectively. The measured AoD (44 degrees) and AoA (43 degrees) are less than or equal to the first reference value (45 degrees) and the second reference value (45 degrees), respectively. As such, when both the AoD and the AoA satisfy the range, the UWB anchor 100 may select any one of the AoD method or the AoA method based on a result obtained by comparing the sizes of the AoD (44 degrees) and the AoA (43 degrees). According to an embodiment, the size of the AoA (43 degrees) is less than that of the AoD (44 degrees), and thus the UWB anchor 100 may select the AoA method.

Thus, the UWB anchor 100 may select the AoA (43 degrees), estimate the AoD as 47 degrees based on the AoA (43 degrees), and determine a direction of the UWB tag 200 according to the obtained AoD (47 degrees) and the AoA (43 degrees).

(3) When Both the Measured AoD and AoA do not Satisfy the Range

For example, the AoD and the AoA that are measured at the second position 820 by the UWB anchor 100 are assumed to be 46 degrees and 47 degrees, respectively. The measured AoD (46 degrees) and AoA (47 degrees) are greater than the first reference value (45 degrees) and the second reference value (45 degrees), respectively. As such, when both the AoD and the AoA do not satisfy the range, the UWB anchor 100 may select any one of the AoD method or the AoA method based on a result obtained by comparing the sizes of the AoD (46 degrees) and AoA (47 degrees). According to an embodiment, the size of the AoD (46 degrees) is less than that of the AoA (47 degrees), and thus the UWB anchor 100 may select the AoD method.

Accordingly, the UWB anchor 100 may select the AoD (46 degrees), estimate the AoA as 44 degrees based on the AoD (46 degrees), and determine a direction of the UWB tag 200 according to the obtained AoD (46 degrees) and AoA (44 degrees).

At a third position 830, the AoD of the signal is 30 degrees and an AoA of the signal is 60 degrees. In this case, the AoD and AoA measured by the UWB anchor 100 may be different from actual values due to errors. For example, the AoD and the AoA that are measured at the third position 830 by the UWB anchor 100 are assumed to be 29 degrees and 55 degrees, respectively. The UWB anchor 100 may compare the measured AoD (29 degrees) with the first reference value (45 degrees) and compare the measured AoA (55 degrees) with the second reference value (45 degrees). The size of the AoD (29 degrees) is less than or equal to the first reference value (45 degrees), and thus the UWB anchor 100 may select the AoD method as a method to be used in direction measurement. Alternatively, according to an embodiment, the measured AoD (29 degrees) may be compared with the AoA (55 degrees) and the size of the AoD (29 degrees) is less than that of the AoA, and thus the UWB anchor 100 may select the AoD method.

Accordingly, the UWB anchor 100 may select the AoD (29 degrees), estimate the AoA as 71 degrees based on the AoD (29 degrees), and determine a direction of the UWB tag 200 according to the obtained AoD (29 degrees) and the AoA (71 degrees).

For a fourth position 840 and a fifth position 850, the UWB anchor 100 may also select a method to be used for direction measurement and thus may measure a direction of the UWB tag 200 by using the method described for the third position 830.

3. No Need for Direction Correction Due to Change in Angle of Orientation

As described above, when the UWB-based positioning system uses the AoA method alone, direction correction is required when the angle of orientation changes while the UWB anchor 100 moves. For example, the UWB anchor 100 may estimate the angle of orientation by using an acceleration sensor or gyro sensor installed therein and correct the direction (AoA) accordingly.

Similarly, when the UWB-based positioning system uses the AoD method alone, direction correction is required when the angle of orientation changes while the UWB tag 200 moves.

According to an embodiment, the UWB-based positioning system may select any one of the AoA method or the AoD method depending on which device moves and measure a direction of the device, and thus there is no need to correct the direction due to a change in the angle of orientation of the moving device.

Figure 9A:
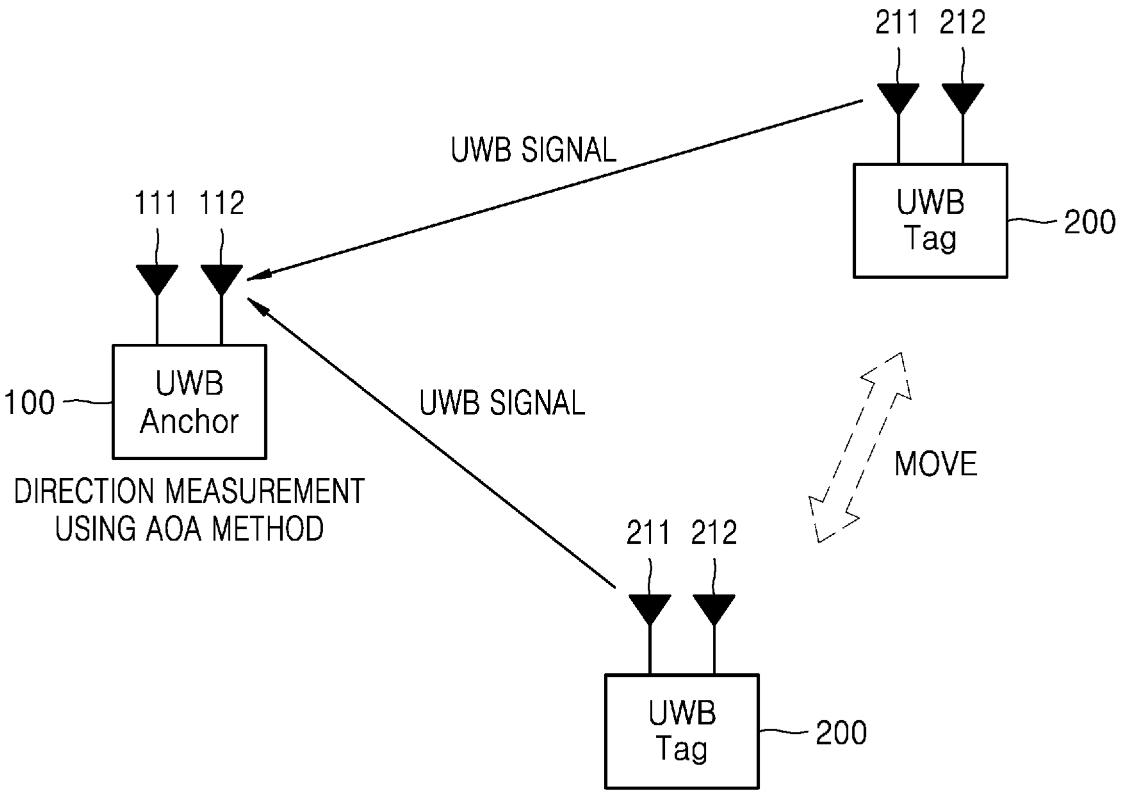
FIGS. 9A and 9B are diagrams for explaining an effect in that direction correction is not required even if any one of devices moves by using AoA and AoD methods at the same in the UWB-based positioning system, according to an embodiment.
Figure 9B:
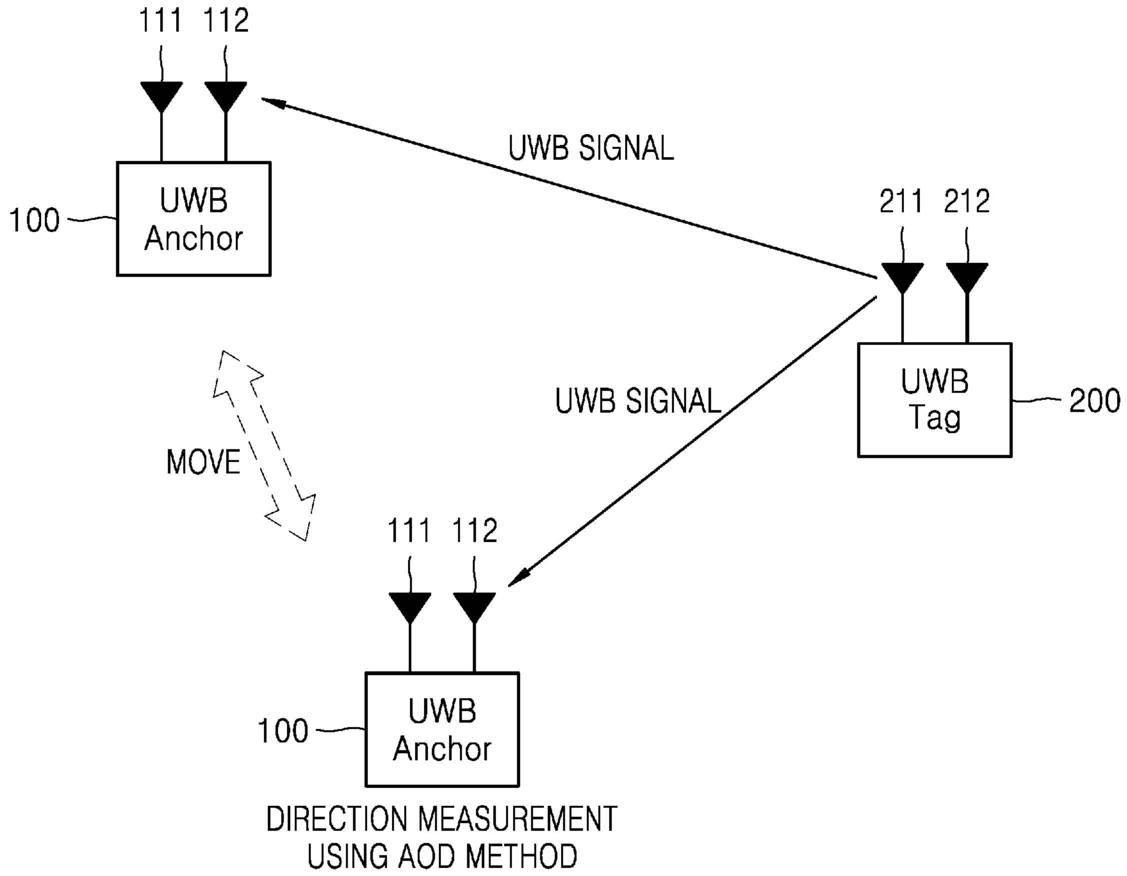

FIGS. 9A and 9B are diagrams for explaining an effect in that direction correction is not required even if any one of devices moves by using AoA and AoD methods at the same time in the UWB-based positioning system, according to an embodiment.

In the embodiment shown in FIG. 9A, it is assumed that the UWB tag 200 moves while the UWB anchor 100 is stationary. The angle of orientation of the UWB tag 200 may change while the UWB tag 200 moves, and accordingly, when the UWB anchor 100 measures an AoD of a signal, a reference for measurement of the AoD may continue to change. On the other hand, the angle of orientation of the UWB anchor 100 is maintained constant, and thus when the UWB anchor 100 measures an AoA of a signal, the AoA may be measured based on a constant reference even if the UWB tag 200 moves. Therefore, as in the embodiment shown in FIG. 9A, when the UWB anchor 100 is stationary and the UWB tag 200 moves, the UWB anchor 100 may measure a direction thereof using the AoA method.

In the embodiment shown in FIG. 9B, it is assumed that the UWB anchor 100 moves while the UWB tag 200 is stationary. The angle of orientation of the UWB anchor 100 may change while the UWB anchor 100 moves, and accordingly, when the UWB anchor 100 measures an AoA of a signal, a reference for measurement of the AoA may continue to change. On the other hand, the angle of orientation of the UWB tag 200 is maintained constant, and thus when the UWB anchor 100 measures an AoA of a signal, the AoA may be measured based on a constant reference even if the UWB anchor 100 moves. Therefore, as in the embodiment shown in FIG. 9B, when the UWB tag 200 is stationary and the UWB anchor 100 moves, the UWB anchor 100 may measure a direction thereof using the AoD method.

As such, to select a direction measurement method depending on which device of the two devices 100 and 200 moves, the UWB anchor 100 needs to identify which device moves. The UWB anchor 100 may know whether the UWB anchor 100 itself moves using various methods. For example, the UWB anchor 100 may determine whether or not the UWB anchor 100 itself moves using an internal acceleration sensor or gyro sensor. Alternatively, for example, the UWB anchor 100 may determine whether or not the UWB anchor 100 itself moves through positioning using a GPS module or cellular communication. The UWB anchor 100 may determine that the UWB tag 200 moves when any one of the AoD or the AoA changes even if the UWB anchor 100 itself does not move.

Figure 10:
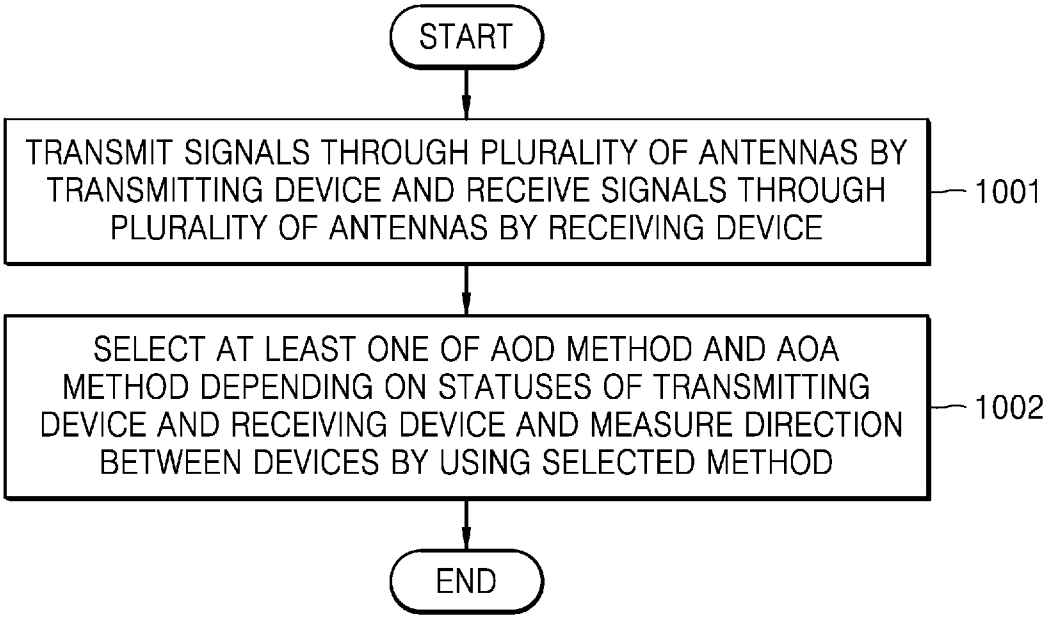
FIGS. 10 to 12 are flowcharts for explaining a method of finding a direction between UWB devices, according to embodiments.
Figure 11:
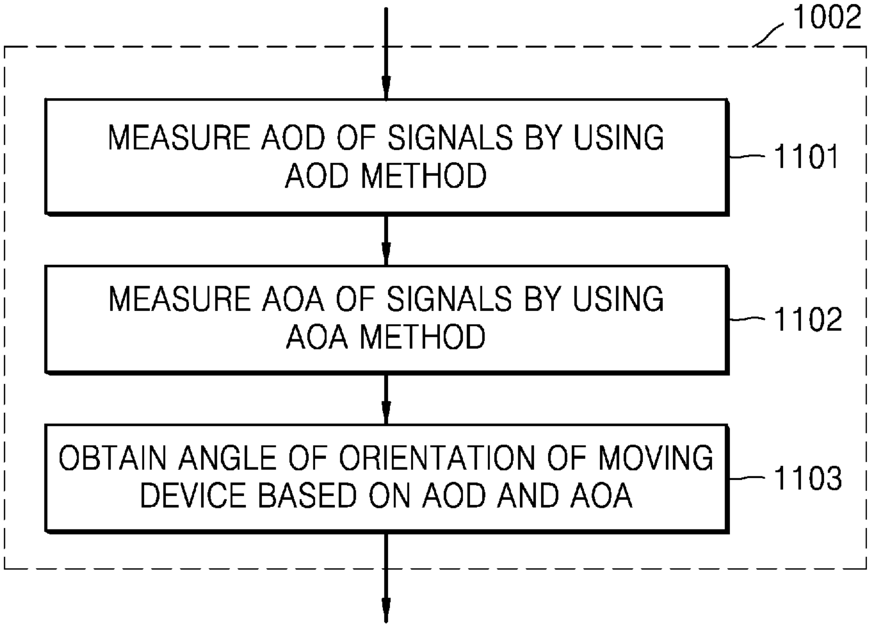
Figure 12:
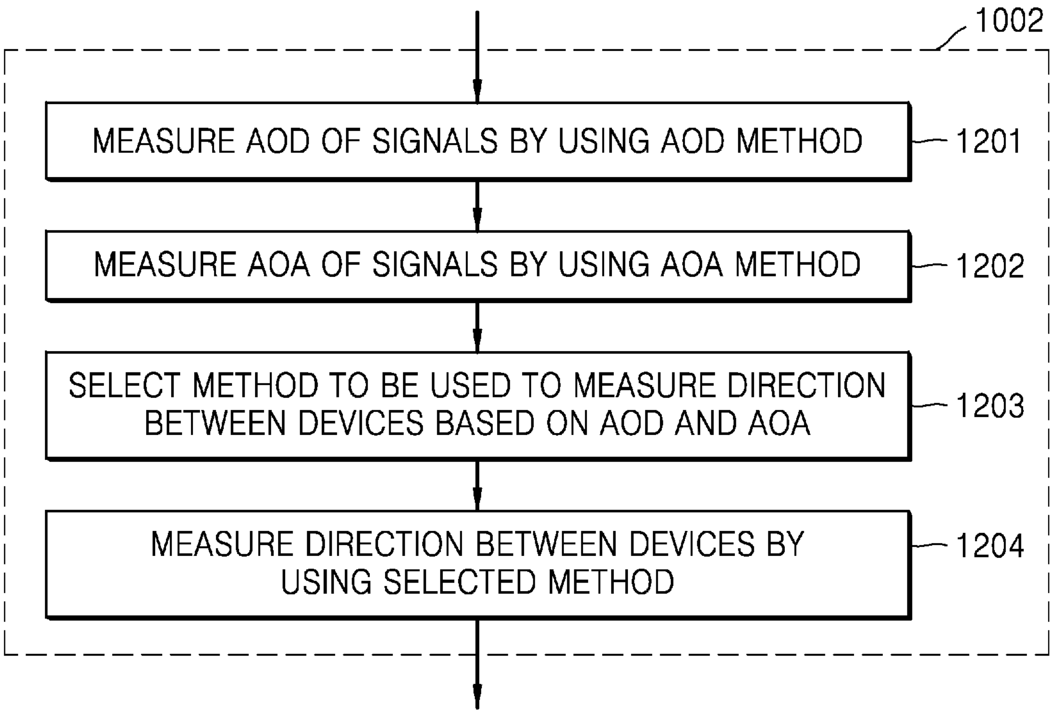

Hereinafter, with reference to FIGS. 10 to 12, a method of finding a direction between UWB devices according to embodiments will be described. Operations included in flowcharts of FIGS. 10 to 12 are assumed to be performed by the UWB anchor 100, that is, a receiving device unless otherwise stated. FIGS. 10 to 12 include operations performed in time series by the UWB anchor 100, and thus the contents described for the UWB anchor 100 with reference to FIGS. 1 to 9 are applicable in the same way to the following embodiments even if omitted below.

Referring to FIG. 10, in operation 1001, a transmitting device may transmit signals through a plurality of antennas, and the receiving device may receive signals through a plurality of antennas. A method of switching antennas when transmitting signal is the same as the above description given with reference to FIGS. 4 and 5. A method of switching antennas when receiving signals may also be implemented in a similar way.

In operation 1002, the receiving device may select at least one of the AoD and AoA methods depending on statuses of the transmitting device and the receiving device and measure a direction between the devices by using the selected method. Detailed operations included in operation 1002 will be described below with reference to FIGS. 11 and 12.

FIG. 11 is a flowchart for explaining detailed operations included in operation 1002 of FIG. 10. Referring to FIG. 11, the receiving device may measure the AoD of signals by using the AoD method in operation 1101 and measure the AoA of the signals by using the AoA method in operation 1102. In operation 1103, the receiving device may obtain (measure) an angle of orientation of a moving device based on the AoD and the AoA.

FIG. 12 is a flowchart for explaining detailed operations included in operation 1002 of FIG. 10. To use the method of FIG. 12, an angle between the angle of orientation of the transmitting device and the angle of orientation of the receiving device needs to be within a preset range.

Referring to FIG. 12, the receiving device may measure the AoD of signals by using the AoD method in operation 1201 and measure the AoA of the signals by using the AoA method in operation 1202.

In operation 1203, the receiving device may select a method to be used for direction measurement between devices based on the measured AoD and AoA.

According to an embodiment, the transmitting device may select the AoD method when the size of the AoD is less than or equal to a preset first reference value and may select the AoA method when the size of the AoA is less than or equal to a preset second reference value.

According to an embodiment, when the size of the AoD and the size of the AoA are less than or equal to the first reference value and the second reference value, respectively, or when the size of the AoD and the size of the AoA are greater than the first reference value and the second reference value, respectively, the transmitting device may select any one of the AoD or AoA method based on a result obtained by comparing the sizes of the AoD and the AoA. For example, the transmitting device may select a method corresponding to a smaller angle from among the AoD and the AoA.

According to an embodiment, the transmitting device may select a method to be used for direction measurement based on the result obtained by comparing the sizes of the AoD and the AoA without a process of comparing the AoD and the AoA with reference values. For example, the transmitting device may select the AoD method when the size of the AoD is less than that of the AoA, and select the AoA method when the size of the AoA is less than that of the AoD.

In operation 1204, the receiving device may measure a direction between devices by using the selected method.

According to an embodiment, in operation 1002, the transmitting device may measure a direction between devices by using the AoD method when the transmitting device is stationary and the receiving device moves, and may also measure the direction between the devices by using the AoA method when the receiving device is stationary state and the transmitting device moves.

According to an embodiment, a method of measuring a direction between devices performing UWB communication and each including a plurality of antennas includes transmitting signals through a plurality of antennas by a transmitting device and receiving the signals through a plurality of antennas by a receiving device, and selecting at least one of an AoD method and an AoA method depending on statuses of the transmitting device and the receiving device and measuring the direction between the devices by using a selected method, and the AoD method is a method of measuring an AoD of signals transmitted through two or more different antennas from the transmitting device based on a phase difference between the transmitted signals, and the AoA method is a method of measuring an AoA of signals received through two or more different antennas by the receiving device based on a phase difference between the received signals.

According to an embodiment, in a state in which any one of the transmitting device or the receiving device moves, the measuring of the direction between the devices may include measuring the AoD of the signals by using the AoD method, measuring the AoA of the signals by using the AoA method, and obtaining an angle of orientation of the moving device based on the AoD and the AoA.

According to an embodiment, when an angle between an angle of orientation of the transmitting device and an angle of orientation of the receiving device is within a preset range, the measuring of the direction between the devices may include measuring the AoD of the signals by using the AoD method, measuring the AoA of the signals by using the AoA method, selecting a method to be used to measure the direction between the devices based on the AoD and the AoA, and measuring the direction between the devices by using the selected method.

According to an embodiment, the selecting of the method to be used to measure the direction between the devices may include selecting the AoD method when a size of the AoD is less than or equal to a preset first reference value and selecting the AoA method when a size of the AoA is less than or equal to a preset second reference value.

According to an embodiment, when the size of the AoD and the size of the AoA are less than or equal to the first reference value and the second reference value, respectively, or when the size of the AoD and the size of the AoA are greater than the first reference value and the second reference value, respectively, the selecting of the method to be used to measure the direction between the devices may include selecting any one of the AoD method or the AoA method based on a result obtained by comparing the size of the AoD and the size of the AoA.

According to an embodiment, the selecting of the method to be used to measure the direction between the devices may include comparing the size of the AoD and the size of the AoA, selecting the AoD method when the size of the AoD is less than the size of the AoA, and selecting the AoA method when the size of the AoA is less than the size of the AoD.

According to an embodiment, the measuring of the direction between the devices may include measuring the direction between the devices by using the AoD method when the transmitting device is stationary and the receiving device moves, and measuring the direction between the devices by using the AoA method when the receiving device is stationary and the transmitting device moves.

According to an embodiment, a receiving device for performing direction finding based on UWB includes an antenna module including a plurality of antennas arranged at half-wavelength intervals of a received signal, a memory configured to store a program therein for performing direction finding, and at least one processor, and the processor is configured to receive signals transmitted through a plurality of antennas from the transmitting device, select at least one of an AoD method and an AoA method depending on statuses of the transmitting device and the receiving device, measure the direction between the devices by using a selected method, and measuring an AoD of signals transmitted through two or more different antennas from the transmitting device based on a phase difference between the transmitted signals, and the AoD method is a method of measuring an AoD of signals transmitted through two or more antennas from the transmitting device based on a phase difference between the transmitted signals and the AoA method is a method of measuring an AoA of signals received through two or more different antennas by the receiving device based on a phase difference between the received signals.

According to an embodiment, in a state in which any one of the transmitting device or the receiving device moves, in measuring the direction between the devices, the processor is configured to measure the AoD of the signal by using the AoD method, measure the AoA of the signal by using the AoA method, and obtain an angle of orientation of the moving device based on the AoD and the AoA.

According to an embodiment, when an angle between an angle of orientation of the transmitting device and an angle of orientation of the receiving device is within a preset range, in measuring the direction between the devices, the processor may be configured to measure the AoD of the signals by using the AoD method, measure the AoA of the signals by using the AoA method, select a method to be used to measure the direction between the devices based on the AoD and the AoA, and then measure the direction between the devices by using the selected method.

According to an embodiment, in selecting the method to be used to measure the direction between the devices, the processor may be configured to select the AoD method when a size of the AoD is less than or equal to a preset first reference value and select the AoA method when a size of the AoA is less than or equal to a preset second reference value.

According to an embodiment, when the size of the AoD and the size of the AoA are less than or equal to the first reference value and the second reference value, respectively, or when the size of the AoD and the size of the AoA are greater than the first reference value and the second reference value, respectively, in selecting the method to be used to measure the direction between the devices, the processor may be configured to select any one of the AoD method or the AoA method based on a result obtained by comparing the size of the AoD and the size of the AoA.

According to an embodiment, in selecting the method to be used to measure the direction between the devices, the processor may be configured to compare the size of the AoD and the size of the AoA, select the AoD method when the size of the AoD is less than the size of the AoA, and select the AoA method when the size of the AoA is less than the size of the AoD.

According to an embodiment, in measuring the direction between the devices, the processor may be configured to measure the direction between the devices by using the AoD method in a state in which the transmitting device is stationary and the receiving device moves, and measure the direction between the devices by using the AoA method in a state in which the receiving device is stationary and the transmitting device moves.

Various embodiments may be implemented or supported by one or more computer programs, and computer programs may be formed from computer-readable program code and may be recorded in a computer-readable medium. In the disclosure, the "application" and "program" are one or more computer programs, software components, command sets, procedures, functions, objects, classes, instances, related data, or parts thereof, which are suitable for implementation in computer readable program code. The "computer-readable program code" may include various types of computer codes including source code, purpose code, and executable code. The "computer-readable medium" may include various types of media to be accessed by a computer, such as read only memory (ROM), random access memory (RAM), hard disk drive (HDD), compact disc (CD), digital video disc (DVD), or various types of memories.

A device-readable storage medium may be provided in the form of a non-transitory storage medium. Here, the "non-transitory storage medium" is a tangible device and may exclude wired, wireless, optical, or other communication links that transmit temporary electrical or other signals. The "non-transitory storage medium" may not distinguish between semi-permanent and temporary storage of data in the storage medium. For example, "non-transitory storage medium" may include a buffer in which data is temporarily stored. A computer-readable medium may be any available medium to be accessed by a computer, and may include volatile and non-volatile media, and separate and non-separated media. The computer-readable medium includes a medium in which data is permanently stored and a medium in which data is stored and overwritten later, such as a rewritable optical disk or an erasable memory device.

According to an embodiment, the method according to the various embodiments disclosed herein may be included in a computer program product and provided. The computer program product may be traded between a seller and a buyer as a product. The computer program product may be distributed in the form of a storage medium (e.g. compact disk read only memory (CD-ROM)) that is to be read on a device, or may be distributed (e.g., downloaded or uploaded) directly or online through an application store or between two user devices (e.g., smartphones). In the case of online distribution, at least some of the computer program products (e.g., downloadable application) may be at least temporarily stored in a device-readable storage medium such as a server of a manufacturer, a server of an application server, or a memory of a relay server, or may be temporarily generated.

The above description of the disclosure is for an example, and one of ordinary skill in the art understands that various changes in form and details may be easily made without changing the technical ideas or required characteristics of the disclosure. For example, the technologies may be performed in a different order from the described methods, and/or the system, structure, device, and circuit described above may be coupled or combined in a different form from the methods described above, or may be replaced or substituted by elements or equivalent objects, thereby achieving appropriate results. Therefore, the above-described embodiments need to be understood as exemplary and not limited in any way. For example, each component described in a single type may be distributed and performed, and similarly, components that are described as distributed may also be performed in a combined form.

The scope of the disclosure is defined by the claims described below rather than the detailed description, and needs to be interpreted as contained in the range of the disclosure or modified form derived from the meaning and range of the claims and an equivalent concept thereof.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method of measuring a direction between devices performing ultra-wide band (UWB) communication and each including a plurality of antennas, the method comprising:

transmitting signals through a plurality of antennas by a transmitting device and receiving the signals through a plurality of antennas by a receiving device; and selecting at least one of an angle of departure (AoD) method and an angle of arrival (AoA) method based on a result of comparing a size of an AoD and a size of an AoA measured by the receiving device, or based on which one of the receiving device and the transmitting device moves, and measuring the direction between the devices by using a selected method, wherein the AoD method is a method of measuring the AoD of signals transmitted through two or more different antennas from the transmitting device based on a phase difference between the transmitted signals, and the AoA method is a method of measuring the AoA of signals received through two or more different antennas by the receiving device based on a phase difference between the received signals.

2. The method of claim 1, wherein, in a state in which any one of the transmitting device or the receiving device moves, the measuring of the direction between the devices includes:

measuring the AoD of the signals by using the AoD method;

measuring the AoA of the signals by using the AoA method; and obtaining an angle of orientation of the moving device based on the AoD and the AoA.

3. The method of claim 1, wherein, when an angle between an angle of orientation of the transmitting device and an angle of orientation of the receiving device is within a preset range, the measuring of the direction between the devices includes:

measuring the AoD of the signals by using the AoD method;

measuring the AoA of the signals by using the AoA method;

selecting a method to be used to measure the direction between the devices based on a result obtained by comparing the size of the AoD and the size of the AoA with at least one reference value; and measuring the direction between the devices by using the selected method.

4. The method of claim 3, wherein the selecting of the method to be used to measure the direction between the devices includes selecting the AoD method when a size of the AoD is less than or equal to a preset first reference value and selecting the AoA method when a size of the AoA is less than or equal to a preset second reference value.

5. The method of claim 4, wherein, when the size of the AoD and the size of the AoA are less than or equal to the first reference value and the second reference value, respectively, or when the size of the AoD and the size of the AoA are greater than the first reference value and the second reference value, respectively, the selecting of the method to be used to measure the direction between the devices includes selecting any one of the AoD method or the AoA method based on a result obtained by comparing the size of the AoD and the size of the AoA.

6. The method of claim 3, wherein the selecting of the method to be used to measure the direction between the devices includes:

comparing the size of the AoD and the size of the AoA; and selecting the AoD method when the size of the AoD is less than the size of the AoA, and selecting the AoA method when the size of the AoA is less than the size of the AoD.

7. The method of claim 1, wherein the measuring of the direction between the devices includes measuring the direction between the devices by using the AoD method when the transmitting device is stationary and the receiving device moves, and measuring the direction between the devices by using the AoA method when the receiving device is stationary and the transmitting device moves.

8. A non-transitory computer readable recording medium having recorded thereon a program for executing the method of claim 1 in a computer.

9. A receiving device for performing direction finding based on ultra-wide band (UWB), the receiving device comprising:

an antenna module including a plurality of antennas arranged at half-wavelength intervals of a received signal;

a memory configured to store a program therein for performing direction finding; and at least one processor, wherein the processor is configured to receive signals transmitted through a plurality of antennas from the transmitting device, select at least one of an angle of departure (AoD) method and an angle of arrival (AoA) method based on a result of comparing a size of an AoD and a size of an AoA measured by the receiving device, or based on which one of the receiving device and the transmitting device moves, and measure the direction between the devices by using a selected method, and the AoD method is a method of measuring the AoD of signals transmitted through two or more antennas from the transmitting device based on a phase difference between the transmitted signals and the AoA method is a method of measuring the AoA of signals received through two or more different antennas by the receiving device based on a phase difference between the received signals.

10. The receiving device of claim 9, wherein, in a state in which any one of the transmitting device or the receiving device moves, in measuring the direction between the devices, the processor is further configured to measure the AoD of the signals by using the AoD method, measure the AoA of the signal by using the AoA method, and then obtain an angle of orientation of the moving device based on the AoD and the AoA.

11. The receiving device of claim 9, wherein, when an angle between an angle of orientation of the transmitting device and an angle of orientation of the receiving device is within a preset range, in measuring the direction between the devices, the processor is further configured to measure the AoD of the signals by using the AoD method, measure the AoA of the signals by using the AoA method, select a method to be used to measure the direction between the devices based on a result obtained by comparing the size of the AoD and the size of the AoA with at least one reference value, and then measure the direction between the devices by using the selected method.

12. The receiving device of claim 11, wherein, in selecting the method to be used to measure the direction between the devices, the processor is further configured to select the AoD method when a size of the AoD is less than or equal to a preset first reference value and select the AoA method when a size of the AoA is less than or equal to a preset second reference value.

13. The receiving device of claim 12, wherein, when the size of the AoD and the size of the AoA are less than or equal to the first reference value and the second reference value, respectively, or when the size of the AoD and the size of the AoA are greater than the first reference value and the second reference value, respectively, in selecting the method to be used to measure the direction between the devices, the processor is further configured to select any one of the AoD method or the AoA method based on a result obtained by comparing the size of the AoD and the size of the AoA.

14. The receiving device of claim 11, wherein, in selecting the method to be used to measure the direction between the devices, the processor is further configured to compare the size of the AoD and the size of the AoA, select the AoD method when the size of the AoD is less than the size of the AoA, and select the AoA method when the size of the AoA is less than the size of the AoD.

15. The receiving device of claim 9, wherein, in measuring the direction between the devices, the processor is configured to measure the direction between the devices by using the AoD method in a state in which the transmitting device is stationary and the receiving device moves, and measure the direction between the devices by using the AoA method in a state in which the receiving device is stationary and the transmitting device moves.

* * * * *